G. HALL.
Harvester Rake.
No. 38,796. Patented June 2, 1863.
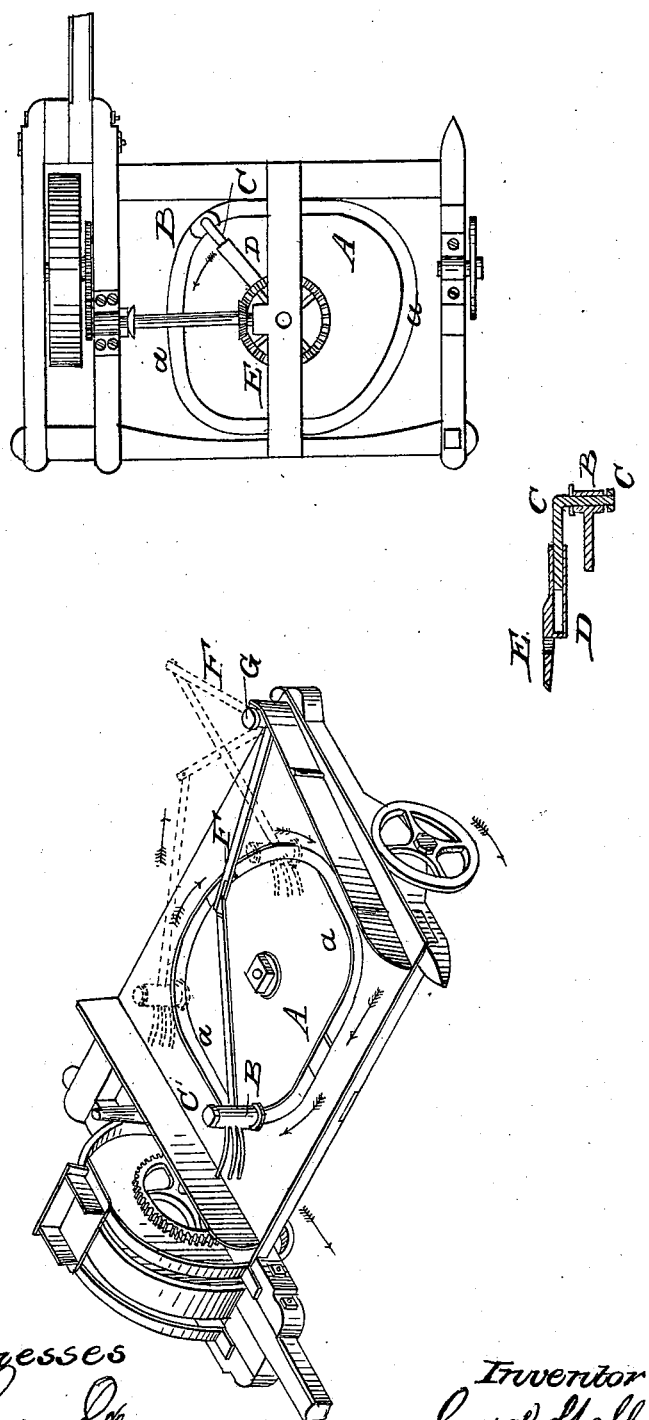

UNITED STATES PATENT OFFICE.

GEORGE HALL, OF BALTIMORE, MARYLAND.

IMPROVEMENT IN RAKES FOR HARVESTERS.

Specification forming part of Letters Patent No. 38,796, dated June 2, 1863.

*To all whom it may concern:*

Be it known that I, GEO. HALL, of the city and county of Baltimore, in the State of Maryland, have invented a certain new and useful Improvement in Automatic Rakes for Harvesters, of which the following is a full, clear, and exact description, reference being had to the accompanying drawings, which make part of this specification, and in which—

Figure 1 represents a view in perspective of a harvester to which my improvements are applied, the black lines showing the rake as moving back to sweep the grain from the platform, the blue as commencing to traverse across the rear of the platform, and the red as moving forward to sweep the grain across the platform; Fig. 2, a plan or view of the under side of the machine inverted, and Fig. 3 a vertical longitudinal section through a portion of the gearing and the mechanism which carries the rake also inverted.

My invention relates to that class of automatic rakes for harvesters in which the rake-head traverses in a guide-slot in the platform; and my improvement consists in mounting the rake-head on an arm provided with a telescopic slide connected to the prime mover, so that the rake may, while rotating around its axis, freely approach or recede from it as occasion requires, and thus conform to the curvature of the guide-slot, whereby I am enabled to dispense with the cumbersome arrangement of belts and pulleys heretofore employed to effect this object.

In the accompanying drawings, the platform A of a harvester is represented as having in it a continuous guide-slot, $a$, the form of which is to be varied according to the motion desired to be given to the rake. A rake-head, B, traverses in this slot, and is mounted on an arm, C, in such manner as to turn freely upon it. This arm slides in a socket, D, secured upon and turning with a bevel-wheel, E, which is driven by suitable gearing from the driving-wheel. In order to keep the rake-teeth in proper position relative to the grain, the rake-head B is attached to a jointed arm, F, secured upon a turning-post, G, upon the platform.

The operation of the rake will be readily understood by reference to the drawings, in which the arrows show the direction of the movements of the several parts. As the machine advances motion is communicated from the driving-gear to the bevel-wheel E, which carries the socket D, into which the arm C, upon which the rake-head B is mounted, slides. The rotary motion of the socket imparts a corresponding movement to the rake-head which traverses in the curved guide-slot $a$, and as the rake-arm C slides freely in its socket the slot may be of any form desired, and the rake caused to traverse a corresponding path in discharging the grain.

What I claim as my invention, and desire to secure by Letters Patent, is—

Mounting the rake-head on an arm provided with a telescopic slide, substantially in the manner described, in combination with a guide-slot in the platform for the purpose of controlling the movements of the rake, as set forth.

In testimony whereof I have hereunto subscribed my name.

GEORGE HALL.

Witnesses:
T. R. RICH,
WM. P. P. STEVENS.